United States Patent
Tsai et al.

(10) Patent No.: US 11,562,648 B2
(45) Date of Patent: Jan. 24, 2023

(54) METHOD FOR PROVIDING ASSISTANCE TO DRIVER BASED ON HD MAP, AND VEHICLE APPARATUS APPLYING METHOD

(71) Applicant: Mobile Drive Technology Co., Ltd., New Taipei (TW)

(72) Inventors: Hsien-Chi Tsai, New Taipei (TW); Chun-Yu Chen, New Taipei (TW)

(73) Assignee: Mobile Drive Netherlands B.V., Amsterdam (NL)

( * ) Notice: Subject to any disclaimer, the term of this patent is extended or adjusted under 35 U.S.C. 154(b) by 0 days.

(21) Appl. No.: 17/136,445

(22) Filed: Dec. 29, 2020

(65) Prior Publication Data

US 2021/0312804 A1    Oct. 7, 2021

(30) Foreign Application Priority Data

Apr. 3, 2020    (CN) .......................... 202010260587.5

(51) Int. Cl.
*G08G 1/0962* (2006.01)
*G08G 1/056* (2006.01)
*G08G 1/052* (2006.01)
*G06V 20/58* (2022.01)

(52) U.S. Cl.
CPC ....... *G08G 1/09626* (2013.01); *G06V 20/584* (2022.01); *G08G 1/052* (2013.01); *G08G 1/056* (2013.01)

(58) Field of Classification Search
CPC .... G08G 1/09626; G08G 1/052; G08G 1/056; G08G 1/0141; G08G 1/096; G08G 1/09623; G08G 1/096716; G08G 1/096725; G08G 1/096775; G08G 1/096783; G08G 1/0969; G06K 9/00825; G06V 20/584; B60W 30/18154; B60W 2520/00; B60W 2552/00; B60W 2554/80
See application file for complete search history.

(56) References Cited

U.S. PATENT DOCUMENTS

| 10,339,400 B1* | 7/2019 | Chai .................... B60R 1/00 |
| 2011/0098916 A1* | 4/2011 | Jang ................. G01C 21/3697 701/533 |
| 2016/0328968 A1* | 11/2016 | Elsheemy ............ G08G 1/0962 |

(Continued)

FOREIGN PATENT DOCUMENTS

| CN | 104658290 A | 5/2015 |
| CN | 104966407 A | 10/2015 |
| CN | 105096631 A | 11/2015 |

(Continued)

*Primary Examiner* — Brian Wilson
(74) *Attorney, Agent, or Firm* — ScienBiziP, P.C.

(57) ABSTRACT

A method for providing driving assistance based on a HD map includes acquiring information such as position of a vehicle and timing, and acquiring a speed of the vehicle based on the manner of driving, and acquiring distance an intersection in front of the vehicle and information from a HD map such as traffic light intersection ahead. Deciding such as whether the vehicle can pass through the intersection based on the speed of the vehicle, intersection distance, and the traffic light information and prompting and/or controlling the vehicle if it is determined that passage through is not possible. A vehicle-mounted apparatus applying the method is also disclosed.

18 Claims, 5 Drawing Sheets

(56) References Cited

U.S. PATENT DOCUMENTS

2019/0206247 A1* 7/2019 Xie ........................ G06N 5/046
2020/0231145 A1* 7/2020 Song ..................... B60W 10/18

FOREIGN PATENT DOCUMENTS

| | | |
|---|---|---|
| CN | 105185140 A | 12/2015 |
| CN | 107826036 A | 3/2018 |
| CN | 109389846 A | 2/2019 |
| CN | 109756867 A | 5/2019 |
| CN | 110097772 A | 8/2019 |
| TW | M489110 U | 11/2014 |
| TW | 201814669 A | 4/2018 |

\* cited by examiner

METHOD FOR PROVIDING ASSISTANCE TO DRIVER BASED ON HD MAP, AND VEHICLE APPARATUS APPLYING METHOD

FIELD

The subject matter herein generally relates to traffic safety.

BACKGROUND

Cars are ever more widespread and traffic safety becomes more important. While negotiating traffic lights, drivers always estimate whether there is an enough time for passing through by driving experience. An incorrect evaluation may be catastrophic. Communications between vehicles and communications between vehicles and traffic light terminals are commonplace. Images of the traffic light of an intersection in front of a vehicle can be captured by a camera in the vehicle. There is no prompt information based on the captured images of traffic light and the location of the current vehicle.

Thus, there is room for improvement in the art.

BRIEF DESCRIPTION OF THE FIGURES

Implementations of the present disclosure will now be described, by way of example only, with reference to the attached figures.

DETAILED DESCRIPTION

Figure 1:
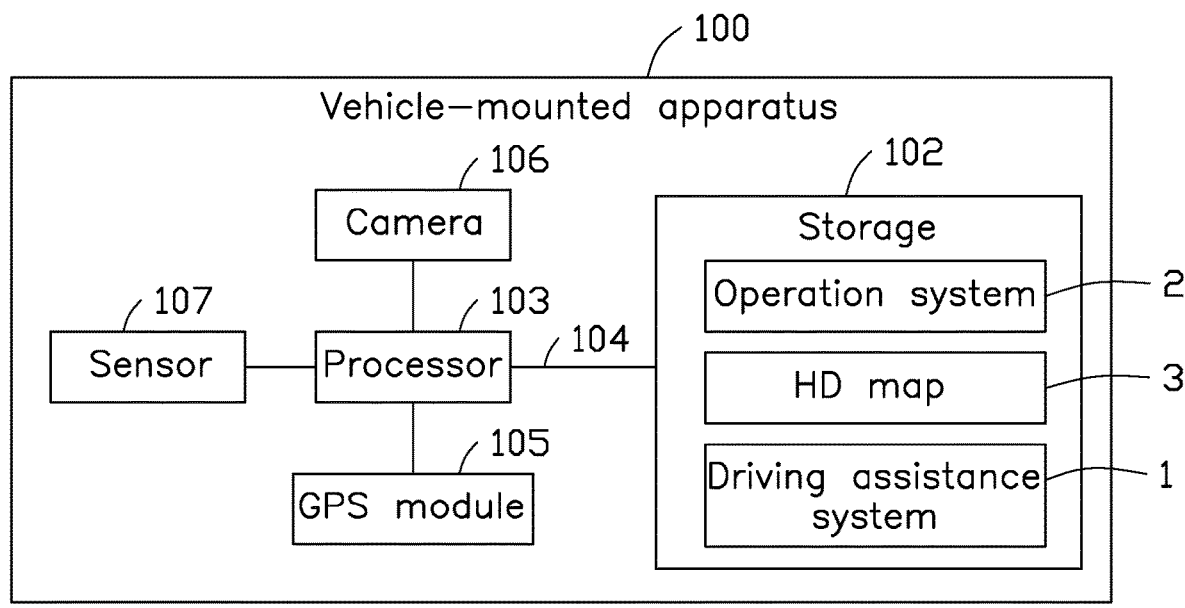
FIG. 1 is a diagram illustrating an embodiment of a vehicle-mounted apparatus; the vehicle-mounted apparatus comprises a driving assistance system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

The present disclosure provides a vehicle-mounted apparatus based on a high-definition (HD) map.

FIG. 1 shows a vehicle-mounted apparatus 100. The vehicle-mounted apparatus 100 includes a storage 102, a processor 103, a data bus 104, a global positioning system (GPS) module 105, a camera 106, and at least one sensor 107.

The vehicle apparatus 100 acquires a position of a vehicle and a time information through the GPS module 105, acquires a speed of the vehicle based on the position information of the vehicle and the time information, acquires an intersection information in front of the position information of the vehicle from the HD map 3, and determines whether the vehicle can pass through the intersection based on the speed of the vehicle and the intersection information. The vehicle-mounted apparatus 100 can further prompt and/or control the vehicle based on the result.

The storage 102 stores program codes. The storage 102 can be an embedded circuit having a storing function, such as a memory card, a trans-flash (TF) card, a smart media card, a secure digital card, and a flash card, and so on. The storage 102 transmits data with the processor 103 through the data bus 104. The storage 102 stores an operation system 2, a HD map 3, and a driving assistance system 1.

The operation system 2 manages and controls hardware and software programs. The operation system 2 further supports operations of the driving assistance system 1 and other software and programs.

The HD map 3 includes a lane information, lane symbols, the intersection information, a speed limit information, and so on. In at least one embodiment, the lane information includes information such as a left turn, a right turn, and a straight-on direction. In other embodiments, the lane information can further include information such as a U-turn, a left turn and straight-on, and a right turn and straight-on, not being limited hereto. The lane information is specific for a corresponding traffic light. For example, when the lane information is a left turn lane, the color of the traffic light corresponding to the left turn lane is acquired. The lane symbols indicate a type of the lane. In one embodiment, the lane symbols can be a left turn arrow, a combined left turn and straight-on arrow, an arrow for a straight-on only lane, and a right turn arrow, not being limited hereto. In at least one embodiment, the intersection information can include a distance of the vehicle passing through the intersection from the position of the vehicle to the current intersection and a traffic light information. The distance of the vehicle passing through the intersection includes a first distance and a second distance. The first distance is a distance between the current position and the current intersection, and the second distance is a width of the current intersection. The traffic light information can include a color information of the traffic light and a traffic light switching function. The intersection generally displays three traffic lights. The color of each traffic light can change between three predefined colors. The traffic light change function stores a table, which records a relationship between colors of the traffic light and switching times. The color of each traffic light switches in a predefined sequence. The colors of each traffic light include red, green, and yellow. The predefined sequence is green to yellow to red to green. The switching time is a time duration from the current display of the color to the display of the next color. For example, when the current display of the color is green, the switching time is a time duration from the current display of the green light until switch to the yellow light. In other embodiment, the traffic light switching function can be achieved from a public traffic information of a server (not shown). The speed limit information can include speed limit symbols and removal speed limit symbols.

Figure 2:
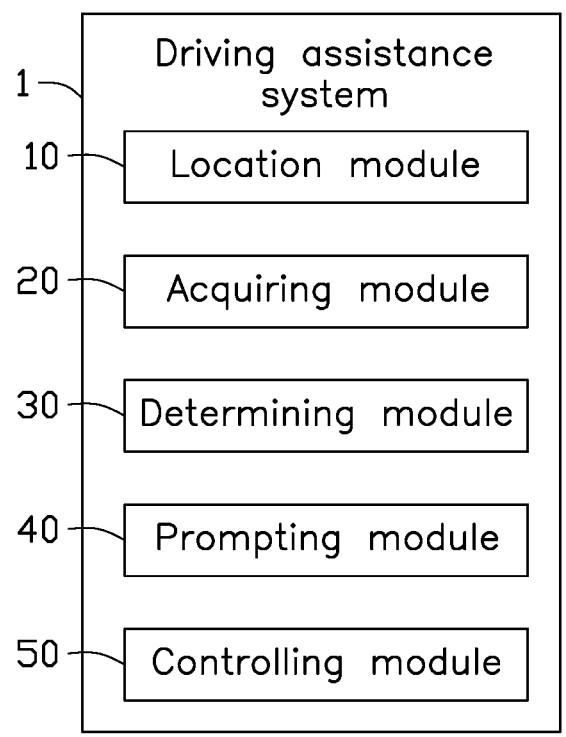
FIG. 2 is a diagram illustrating an embodiment of the driving assistance system of FIG. 1.

The processor 103 can be a micro-processor or a digital processor. The processor 103 is used for running the program codes stored in the storage 102 to execute different functions. Modules in FIG. 2 are program codes stored in the storage 102 and are implemented by the processor 103 for executing a method for driving assistance based on the HD map 3. The processor 103 can be a central processing unit (CPU), or a large scale integrated circuit, being an operating core and a control core.

The data bus 104 transmits data with the storage 102 and the processor 103.

The GPS module 105 locates the position of the vehicle-mounted apparatus 100 (such as longitude and latitude information) and indicates time information.

The camera 106 can capture still images or record video while driving. In at least one embodiment, the camera 106 can be set inside or beside the vehicle. For example, the cameral 106 can be the data recorder inside the vehicle or a camera on a rearview mirror outside the vehicle. When the camera 106 outside the vehicle, the processor 103 can controls the camera 106 to rotate for obtaining the traffic information.

The at least one sensor 107 can detect a distance between the vehicle and other vehicles. In at least one embodiment, the at least one sensor 107 can include a radar sensor, a speed sensor, and an acceleration sensor, not being limited hereto.

FIG. 2 shows the driving assistance system 1. The driving assistance system 1 includes a plurality of modules.

A location module 10 acquires driving characteristics of the vehicle.

In at least one embodiment, the driving characteristics can include position information of the vehicle and time information of the vehicle. The location module 10 acquires the driving characteristics through the GPS module 105.

An acquiring module 20 calculates a speed of the vehicle based on the driving characteristics.

In at least one embodiment, there is information such as two different positions of the vehicle and information such as two different times. The acquiring module 20 acquires a distance between the two different positions and calculates a time interval between the two different times. The speed of the vehicle based on such distance and such time interval is acquired. In other embodiment, the speed of the vehicle can also be acquired by the at least one sensor on the wheel of the vehicle or a speed sensor in the vehicle.

The acquiring module 20 further acquires intersection information in front of the position information of the vehicle from the HD map based on the driving characteristics.

In at least one embodiment, the intersection information includes a distance of the vehicle passing through the intersection and a traffic light information. The acquiring module 20 further calculates the distance of the vehicle passing through the intersection based on the position information of the vehicle and the acquired intersection information in front of the vehicle. The distance of the vehicle passing through the intersection includes a distance between the vehicle and the intersection based on position information of the vehicle and a width of the intersection in front of the position of the vehicle. In at least one embodiment, the distance between the vehicle and the intersection and the width of the intersection are obtained through the HD map 3. In another embodiment, one of the distance between the vehicle and the intersection and the width of the intersection can be obtained through the HD map 3, and the other of the distance between the vehicle and the intersection and the width of the intersection can be obtained through the camera 106. In another embodiment, both the distance between the vehicle and the intersection and the width of the intersection are obtained by the camera 106.

A determining module 30 determines whether the distance between the vehicle and the intersection is less than a predefined distance.

If the distance between the vehicle and the intersection and the width of the intersection is less than the predefined distance, the acquiring module 20 further acquires the traffic light information.

The acquiring module 20 further acquires the traffic light information through the camera 106 or the HD map 3. The traffic light information can include a color information of the traffic light and a traffic light switching function. The intersection corresponds to three traffic lights. The color of each traffic light can change between three predefined colors. The traffic light change function stores a table, which records a relationship between colors of the traffic light and timing of the switching between. The color of each traffic light switches in a predefined sequence. The colors of each traffic light include red, green, and yellow. The predefined sequence is green to yellow to red to green. The switching time is a time duration from the display of the current color to the display of the next color. For example, if the current color of the traffic light is green, the switching time is a time duration from the display of the green to the display of the yellow.

The determining module 30 further determines whether the vehicle can pass through the intersection based on the speed of the vehicle and the intersection information.

The acquiring module 20 further acquires a first time information corresponding to the color of the traffic light switching from green to yellow by the camera 106, and acquires the position information of the vehicle corresponding to the first time information through the location module 10, acquires the distance of the vehicle passing through the intersection based on the position information of the vehicle corresponding to the first time information, acquires a first reference time duration based on the distance of the vehicle passing through the intersection and the speed of the vehicle, and acquires a second reference time duration based on the first time information and the traffic light switching function.

In at least one embodiment, the second reference time duration is a switching time duration for switching the current color of the corresponding traffic light to a next color. For example, when the time of switching the color of the corresponding traffic light switches from green to yellow at 10:23:00, the first time information is 12:23:00. The position information of the vehicle is acquired by the location module 10 based on the first time information. The distance of the vehicle passing through the intersection is acquired based on the HD map 3 based on the acquired position information of the vehicle. The distance of the vehicle passing through the intersection includes the first distance and the second distance. The first distance is a distance between the position and the intersection, and the second distance is a width of the intersection. The first reference time duration is 10 seconds based on the distance of the vehicle passing through the intersection and the speed of the vehicle. The second reference time duration of switching the color of the corresponding traffic light from yellow to red is 5 seconds based the traffic light switching function. The first reference time duration is equal to or greater than the second reference time duration, thus the vehicle cannot pass through the intersection.

In another embodiment, when the color of the corresponding traffic light switches from green to yellow at 12:10:00, the first time information is 12:10:00. The position information of the vehicle is acquired by the location module 10 based on the first time information. The distance of the vehicle passing through the intersection is acquired based on the HD map 3 based on the acquired position information of the vehicle. The distance of the vehicle passing through the intersection includes the first distance and the second distance. The first distance is a distance between the position information of the vehicle and the intersection, and the second distance is a width of the intersection. The first reference time duration is 3 seconds based on the distance of the vehicle passing through the intersection and the speed of the vehicle. The second reference time duration of switching the color of the corresponding traffic light from yellow to red is 5 seconds based the traffic light switching function. The first reference time duration is shorter than the second reference time duration, thus it is determined that the vehicle can pass through the intersection.

A prompting module 40 generates a prompt to driver when it is determined that the vehicle cannot pass through the intersection. In at least one embodiment, the prompt can be a voice prompt, an image prompt, a whistling prompt, not being limited hereto.

A controlling module 50 generates a control event when the vehicle cannot pass through the intersection. In at least one embodiment, the control event can be a slow-down instruction, a stop instruction, a whistling instruction, not being limited hereto.

The determining module 30 further detects whether an object is in front of the vehicle.

In at least one embodiment, the detecting operation is executed by the camera 106 or the at least one sensor 107. The at least one sensor 107 is a radar sensor or a lidar sensor of vehicle.

The acquiring module 20 further calculates a relative distance between the vehicle and the object when the object is in front of the vehicle.

The determining module 30 further determines whether the object affects the vehicle passing through the intersection, based on the relative distance and the speed of the vehicle. In at least one embodiment, when the relative distance is less than a predefined distance, the determining module 30 determines that the object affects the vehicle to pass through the intersection.

The prompting module 40 further generates a warning information.

In at least one embodiment, the warning information can be a voice information, an image information, or a combination of both information.

The acquiring module 20 further acquires a driving direction of other vehicle and a driving direction of the vehicle through the at least one sensor 107.

In at least one embodiment, the driving direction of the other vehicle and the driving direction of the vehicle are acquired by the at least one sensor 107.

The determining module 30 further determines whether the driving direction of other vehicle is intersected with the driving direction of the vehicle in the intersection.

The prompting module 40 further outputs warning information if the driving direction of other vehicle is intersected with the driving direction of the vehicle in the intersection.

Based on the vehicle-mounted apparatus 100 with the HD map 3, driving characteristics are acquired, the speed of the vehicle and the intersection information being used for determining whether the vehicle can pass through the intersection. If the vehicle cannot pass the intersection a prompt and/or control event are generated, a precision driving assistance is provided, safety while driving the vehicle is improved, and a smart control of the vehicle is optimized.

In at least one embodiment, a method for driving assistance is used in the driving assistance system 1 of the vehicle-mounted apparatus 100 of a vehicle. The vehicle-mounted apparatus 100 can include a part or more hardware or software in FIGS. 1 and 2, or the elements in different location. The vehicle-mounted apparatus 100 can communicate with the server through a wireless communication network. The wireless communication network can be a mobile communication network or a satellite network. In at least one embodiment, the server can be a single server, and can be a server group with servers having different functions. The vehicle-mounted apparatus 100 can provide a visible interface. The visible interface provides an interface for user to communicate with the vehicle-mounted apparatus 100. The user can use mobile phone or computer to connect with the vehicle-mounted apparatus 100. The method is used for acquiring a position information of the vehicle and a time information of the vehicle through location module 10, acquiring a speed of the vehicle based on the position information of the vehicle and the time information of the vehicle, acquiring an intersection information in front of the vehicle based on the HD map 3, and can determine whether the vehicle can pass the intersection based on the speed and the intersection information, and prompting and/or controlling the vehicle based on the determining result.

Figure 3:
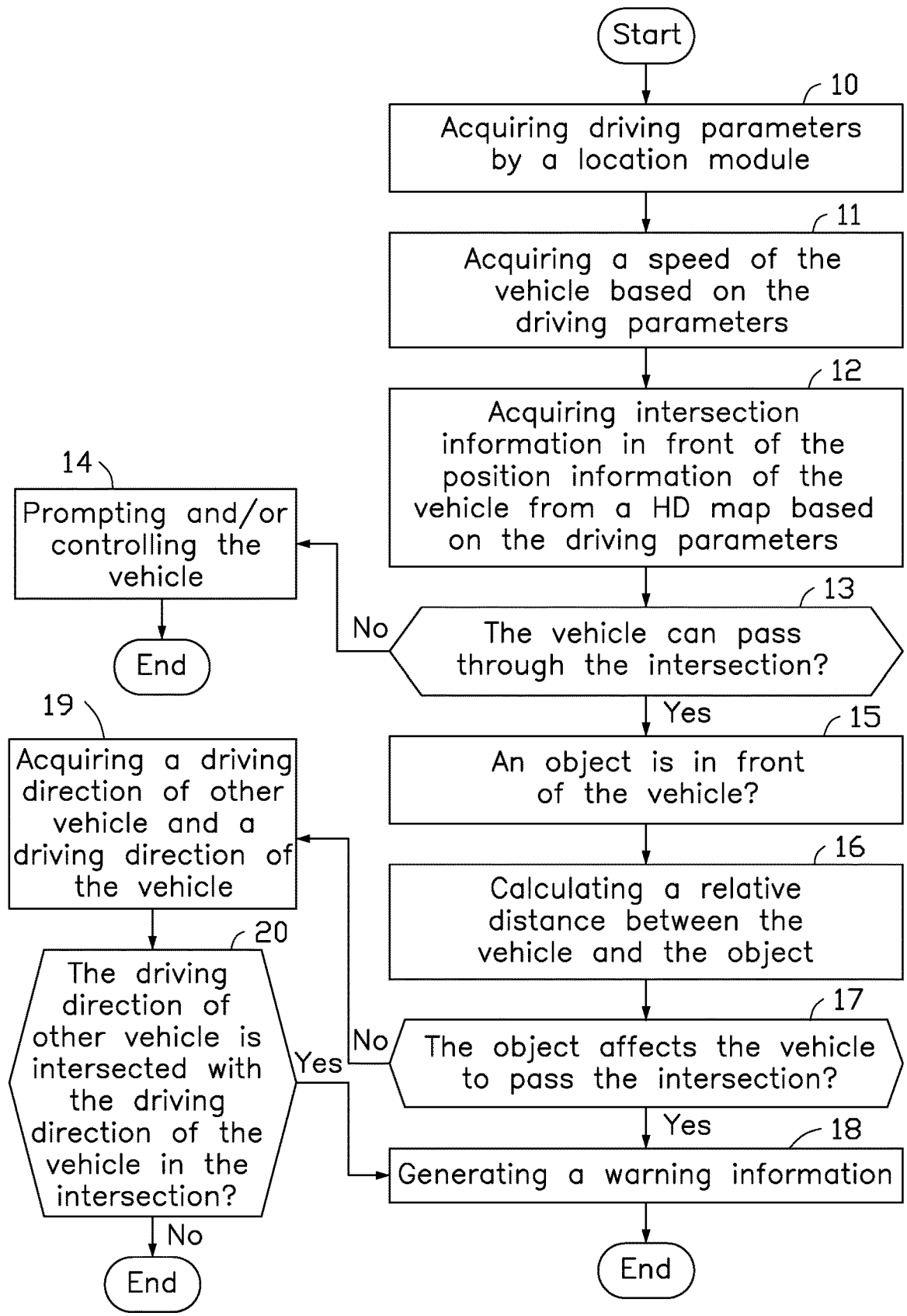
FIG. 3 is a flowchart illustrating an embodiment of a method for driving assistance to a driver.

FIG. 3 shows a flowchart of a method for the above. The vehicle-mounted apparatus 100 processes the program codes in the storage 102 by the processor 103 to execute the location module 10, the acquiring module 20, the determining module 30, the controlling module 50, and communicates with the GPS module 105, the camera 106, and at least one sensor 107 to execute the method for driving assistance.

The method may comprise at least the following steps, which also may be re-ordered:

In block 10, the location module 10 acquires driving characteristics.

In at least one embodiment, the driving characteristics can include position information of the vehicle and time information. The location module 10 acquires the driving characteristics through the GPS module 105.

In block 11, the acquiring module 20 acquires a speed of the vehicle based on the driving characteristics.

In at least one embodiment, there is information such as two different positions of the vehicle and information such as two different time, the acquiring module 20 calculates a distance between the two different position information of the vehicle and calculates a time interval based on the two different time. The speed of the vehicle based on such distance and such time are acquired the speed of the vehicle based on the distance and the time interval. In other embodiment, the speed of the vehicle can also be acquired by the at least one sensor on the wheel of the vehicle or a speed sensor in the vehicle.

In block 12, the acquiring module 20 further acquires the intersection information in front of the position information of the vehicle based on the driving characteristics.

In at least one embodiment, the intersection information includes a distance of the vehicle passing through the intersection and a traffic light information. The distance of the vehicle passing through the intersection includes a distance between the vehicle and the intersection and a width of the intersection. In at least one embodiment, the distance between the vehicle and the intersection and the width of the intersection are obtained through the HD map 3. In another embodiment, one of the distance between the vehicle and the intersection and the width of the intersection can be obtained through the HD map 3, and the other of the distance between the vehicle and the intersection and the width of the intersection can be obtained through the camera 106. In another embodiment, both the distance between the vehicle and the intersection and the width of the intersection are obtained by the camera 106.

The traffic light information includes a color information of the traffic light and a traffic light switching function. The intersection generally displays three traffic lights. The color of each traffic light can change between three predefined colors. The traffic light change function stores a table, which records a relationship between colors of the traffic light and switching time. The color of each traffic light switches in a predefined sequence. The colors of each traffic light include red, green, and yellow. The predefined sequence is green to yellow to red to green. The switching time is a time duration from the current display of color to the display of the next color. For example, when the current display of the color is green, the switching time is a time duration from the current display of the green until switching to the yellow light.

Figure 4:
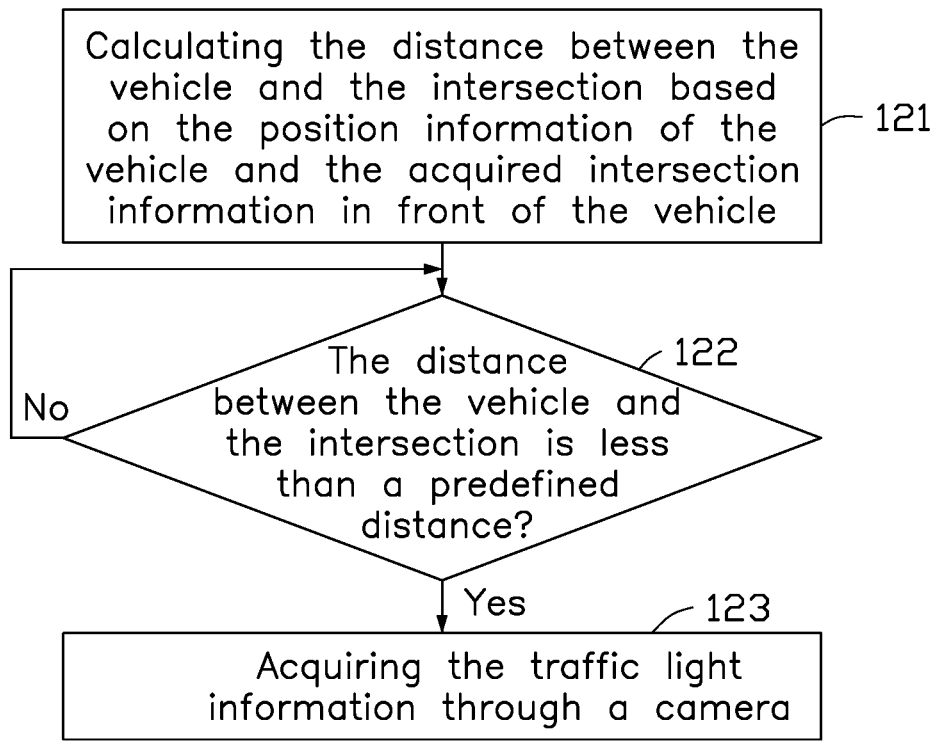
FIG. 4 is a detailed flowchart illustrating an embodiment of block 12 in FIG. 3.

FIG. 4 shows a detailed flowchart of the block 12.

In block 121, the acquiring module 20 further calculates the distance between the vehicle and the intersection based on the position information of the vehicle and the acquired intersection information in front of the vehicle.

In block 122, the determining module 30 determines whether the distance between the vehicle and the intersection is less than a predefined distance.

In block 123, the acquiring module 20 acquires traffic light information through the camera 106 when the distance between the vehicle and the intersection is less than the predefined distance.

When the distance between the vehicle and the intersection is greater than the predefined distance, the procedure returns to block 121.

In block 13, the determining module 30 determines whether the vehicle can pass through the intersection based on the speed of the vehicle and the intersection information.

Figure 5:
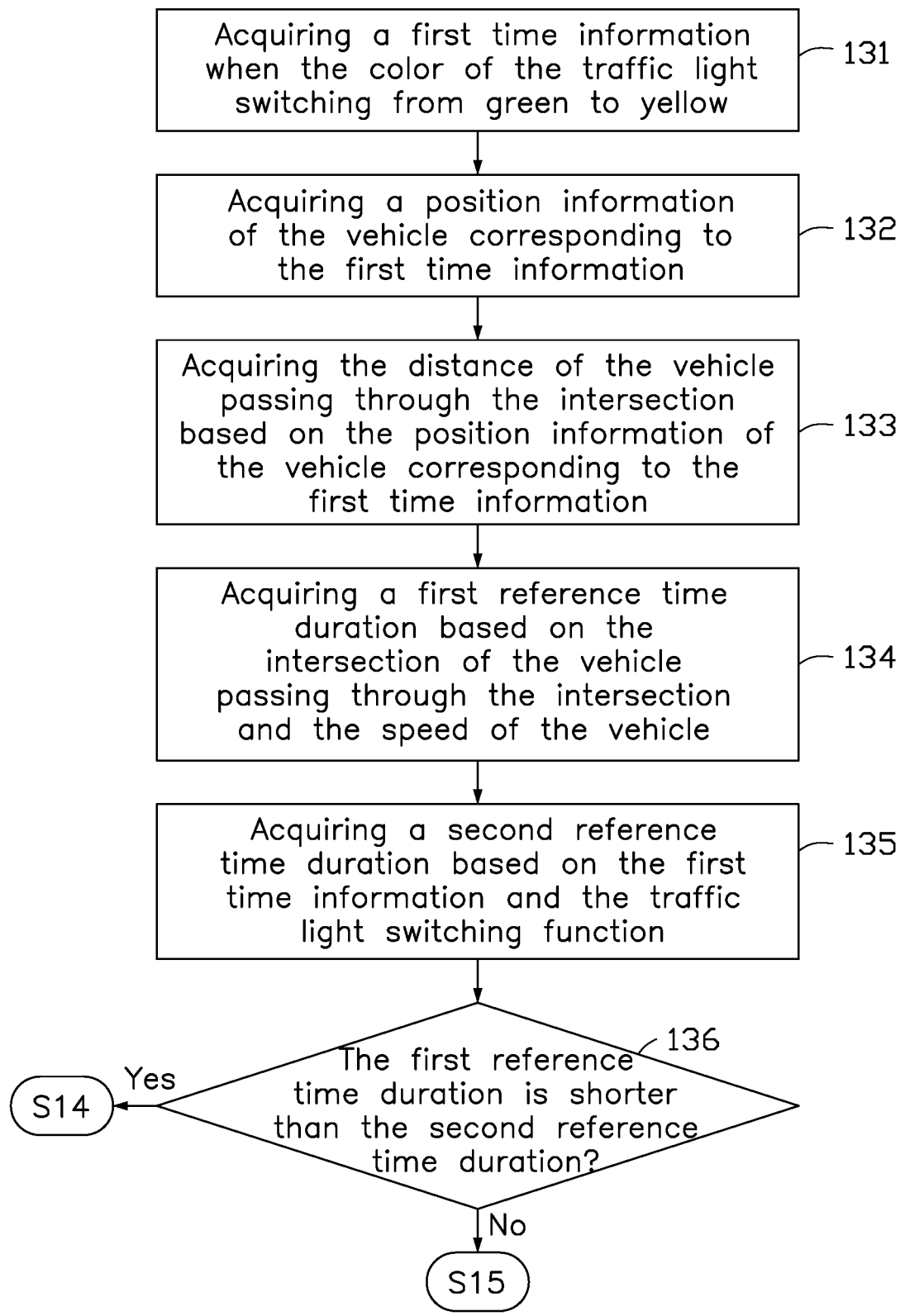
FIG. 5 is a detailed flowchart illustrating an embodiment of block 13 in FIG. 3.

FIG. 5 shows a detailed flowchart of the block 13.

In block 131, the acquiring module 20 further acquires a first time information when the color of the traffic light switches from green to yellow.

In block 132, the acquiring module 20 further acquires the position information of the vehicle corresponding to the first time information.

In block 133, the acquiring module 20 further acquires the distance of the vehicle passing through the intersection based on the position information of the vehicle corresponding to the first time information.

In block 134, the acquiring module 20 further acquires a first reference time duration based on the distance of the vehicle passing through the intersection and the speed of the vehicle.

In block 135, the acquiring module 20 further acquires a second reference time duration based on the first time information and the traffic light switching function.

In block 136, the determining module 30 further determines whether the first reference time duration is shorter than the second reference time duration.

When the first reference time duration is equal to or greater than the second reference time duration, the vehicle cannot pass through the intersection, and the procedure goes to block 14.

When the first reference time duration is shorter than the second reference time duration, the vehicle can pass through the intersection, and the procedure goes to block 15.

In at least one embodiment, the second reference time duration is a switching time duration for switching the current color of the corresponding traffic light to a next color. For example, when the first time of switching the color of the corresponding traffic light switches from green to yellow at 10:23:00, the first time information is 12:23:00. The position information of the vehicle is acquired by the location module 10 based on the first time information. The distance of the vehicle passing through the intersection is acquired based on the HD map 3 based on the acquired position information of the vehicle. The distance of the vehicle passing through the intersection includes the first distance and the second distance. The first distance is a distance between the position of the vehicle and the intersection, and the second distance is a width of the intersection. The first reference time duration is 10 seconds based on the distance of the vehicle passing through the intersection and the speed of the vehicle. The second reference time duration of switching the color of the corresponding traffic light from yellow to red is 5 seconds based the traffic light switching function. The first reference time duration is shorter than the second reference time duration, thus the vehicle cannot pass through the intersection.

In another embodiment, when the color of the corresponding traffic light switches from green to yellow at 12:10:00, the first time information is 12:10:00. The position information of the vehicle is acquired by the location module 10 based on the first time information. The distance of the vehicle passing through the intersection is acquired based on the HD map 3 based on the acquired position information of the vehicle. The distance of the vehicle passing through the intersection includes the first distance and the second distance. The first distance is a distance between the position of the vehicle and the intersection, and the second distance is a width of the intersection. The first reference time duration is 3 seconds based on the distance of the vehicle passing through the intersection and the speed of the vehicle. The second reference time duration of switching the color of the corresponding traffic light from yellow to red is 5 seconds based the traffic light switching function. The first reference time duration is less than the second reference time duration, thus it is determined that the vehicle can pass through the intersection.

In block 14, a prompt and/or a control event is/are generated by the prompting module 40 and/or the controlling module 50.

In at least one embodiment, the prompt can be a voice prompt, an image prompt, a whistling prompt, not being limited hereto.

In block 15, the determining module 30 further detects whether an object is in front of the vehicle.

In at least one embodiment, the detecting operation is executed by the camera 106 or the at least one sensor 107. The at least one sensor 107 is a radar sensor or a lidar sensor of the vehicle.

In block 16, the acquiring module 20 further acquires a relative distance between the vehicle and the object if the object is in front of the vehicle.

In block 17, the determining module 30 further determines whether the object affects the vehicle passing through the intersection based on the relative distance and the speed of the vehicle.

In block 18, the prompting module 40 generates a warning information when the object affects the vehicle to pass through the intersection based on the relative distance.

In at least one embodiment, when the relative distance is less than a predefined distance, the determining module 30 determines the object affects the vehicle to pass through the intersection.

In block 19, the acquiring module 20 further acquires a driving direction of other vehicle and a driving direction of the vehicle when the object does not affect the vehicle to pass through the intersection.

In at least one embodiment, the driving direction of the other vehicle and the driving direction of the vehicle are acquired by the at least one sensor 107.

In block 20, the determining module 30 further determines whether the driving direction of other vehicle is intersected with the driving direction of the vehicle in the intersection.

When the driving direction of other vehicle is not intersected with the driving direction of the vehicle in the intersection, the procedure ends.

When the driving direction of other vehicle is intersected with the driving direction of the vehicle in the intersection, the procedure goes to block 18.

Based on the method for driving assistance based on the HD map 3, driving characteristics are acquired, the speed of the vehicle are acquired based on the driving characteristics, the speed of the vehicle and the intersection information are used for determining whether the vehicle can pass through the intersection, when the vehicle cannot pass the intersection a prompt or control instructions are generated, a precision driving assistance is provided, a safety while driving the vehicle is improved, and a smart control of the vehicle is optimized.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A method for driving assistance based on a HD map used in a vehicle-mounted apparatus of a vehicle, the method comprising:
   acquiring driving characteristics by a location module, the driving characteristics comprise a position information of the vehicle and a time information of the vehicle;
   acquiring a speed of the vehicle based on the driving characteristics;
   acquiring intersection information in front of the position information of the vehicle from the HD map based on the driving characteristics, the intersection information comprising a distance of the vehicle passing through the intersection and a traffic light information; wherein the distance of the vehicle passing through the intersection comprises a first distance and a second distance, the first distance is a distance between the vehicle and the intersection based on the position information, and the second distance is a width of the intersection in front of the vehicle;
   determining whether the vehicle can pass through the intersection based on the speed of the vehicle and the intersection information; and
   prompting and/or controlling the vehicle based on the determined result;
   detecting whether an object is in front of the vehicle;
   calculating a relative distance between the vehicle and the object if the object is in front of the vehicle;
   determining that the object affects the vehicle passing through the intersection when the relative distance is less than a predefined distance; and
   generating warning information if the object affects the vehicle to pass through the intersection.

2. The method of claim 1, wherein the traffic light information comprises a color of the traffic light and a traffic light switching function.

3. The method of claim 2, wherein the step of determining whether the vehicle passing through the intersection based on the speed of the vehicle and the intersection information comprises:
   acquiring a first time information corresponding to the color of the traffic light switching from green to yellow;
   acquiring the position information of the vehicle corresponding to the first time information;
   acquiring the distance of the vehicle passing through the intersection based on the position information of the vehicle corresponding to the first time information;
   acquiring a first reference time duration based on the distance of the vehicle passing through the intersection and the speed of the vehicle;
   acquiring a second reference time duration based on the first time information and the traffic light switching function; and
   determining the vehicle passing through the intersection if the first reference time duration is shorter than the second reference time duration.

4. The method of claim 2, wherein the traffic light information is acquired by a camera of the vehicle.

5. The method of claim 2, wherein the traffic light switching function is acquired from the HD map.

6. The method of claim 1, wherein the step of acquiring intersection information in front of the position information of the vehicle from the HD map based on the driving characteristics comprises:
   calculating a distance between the vehicle and the intersection based on the position information of the vehicle and the acquired intersection information in front of the position information of the vehicle;
   determining whether the distance between the vehicle and the intersection is less than a predefined distance; and
   acquiring the traffic light information by a camera if the distance between the vehicle and the intersection is less than the predefined distance.

7. The method of claim 1, wherein the step of detecting whether an object is in front of the vehicle is detected by a radar sensor or a lidar sensor.

8. The method of claim 1, the method further comprising:
acquiring a driving direction of another vehicle and a driving direction of the vehicle; and
generating warning information if the driving direction of the other vehicle is intersected with the driving direction of the vehicle in the intersection.

9. The method of claim 8, wherein the step of acquiring a driving direction of other vehicle is acquired by a radar sensor or a lidar sensor of the vehicle.

10. A vehicle-mounted apparatus of a vehicle based on a HD map, the vehicle-mounted apparatus comprises a processor and a storage; the processor executes program codes stored in the storage to implement the following steps:
acquiring driving characteristics by a location module, the driving characteristics comprises a position information of the vehicle and a time information of the vehicle;
acquiring a speed of the vehicle based on the driving characteristics;
acquiring intersection information in front of the position information of the vehicle from the HD map based on the driving characteristics, the intersection information comprising a distance of the vehicle passing through the intersection and a traffic light information; wherein the distance of the vehicle passing through the intersection comprises a first distance and a second distance, the first distance is a distance between the vehicle and the intersection based on the position information, and the second distance is a width of the intersection in front of the vehicle;
determining whether the vehicle can pass through the intersection based on the speed of the vehicle and the intersection information; and
prompting and/or controlling the vehicle based on the determined result;
detecting whether an object is in front of the vehicle;
calculating a relative distance between the vehicle and the object if the object is in front of the vehicle;
determining that the object affects the vehicle passing through the intersection when the relative distance is less than a predefined distance; and
generating warning information if the object affects the vehicle to pass through the intersection.

11. The vehicle-mounted apparatus of claim 10, wherein the traffic light information comprises a color of the traffic light and a traffic light switching function.

12. The vehicle-mounted apparatus of claim 11, wherein the step of determining whether the vehicle can pass through the intersection based on the speed of the vehicle and the intersection information comprises:
acquiring a first time information corresponding to the color of the traffic light switching from green to yellow;
acquiring the position information of the vehicle corresponding to the first time information;
acquiring the distance of the vehicle passing through the intersection based on the position information of the vehicle corresponding to the first time information;
acquiring a first reference time duration based on the distance of the vehicle passing through the intersection and the speed of the vehicle;
acquiring a second reference time duration based on the first time information and the traffic light switching function; and
determining the vehicle passing through the intersection if whether the first reference time duration is shorter than the second reference time duration.

13. The vehicle-mounted apparatus of claim 11, wherein the traffic light switching function information is acquired by a camera of the vehicle.

14. The vehicle-mounted apparatus of claim 11, wherein the traffic light switching function information is acquired by the HD map.

15. The vehicle-mounted apparatus of claim 10, wherein the step of acquiring intersection information in front of the position information of the vehicle from the HD map based on the driving characteristics comprises:
calculating a distance between the vehicle and the intersection based on the position information of the vehicle and the acquired intersection information in front of the position information of the vehicle;
determining whether the distance between the vehicle and the intersection is less than a predefined distance; and
acquiring the traffic light information by a camera if the distance between the vehicle and the intersection is less than the predefined distance.

16. The vehicle-mounted apparatus of claim 10, wherein the object is in front of the vehicle is detected by a radar sensor or a lidar sensor.

17. The vehicle-mounted apparatus of claim 10, wherein the steps implemented by the processor further comprises:
acquiring a driving direction of another vehicle and a driving direction of the vehicle; and
generating warning information if the driving direction of the other vehicle is intersected with the driving direction of the vehicle.

18. The vehicle-mounted apparatus of claim 17, wherein the positions of the other vehicle are acquired by a radar sensor in the vehicle.

* * * * *